June 18, 1946.  J. R. MACDONALD  2,402,199
METHOD OF KEEPING FISH IN FRESH CONDITION
Filed Nov. 1, 1939
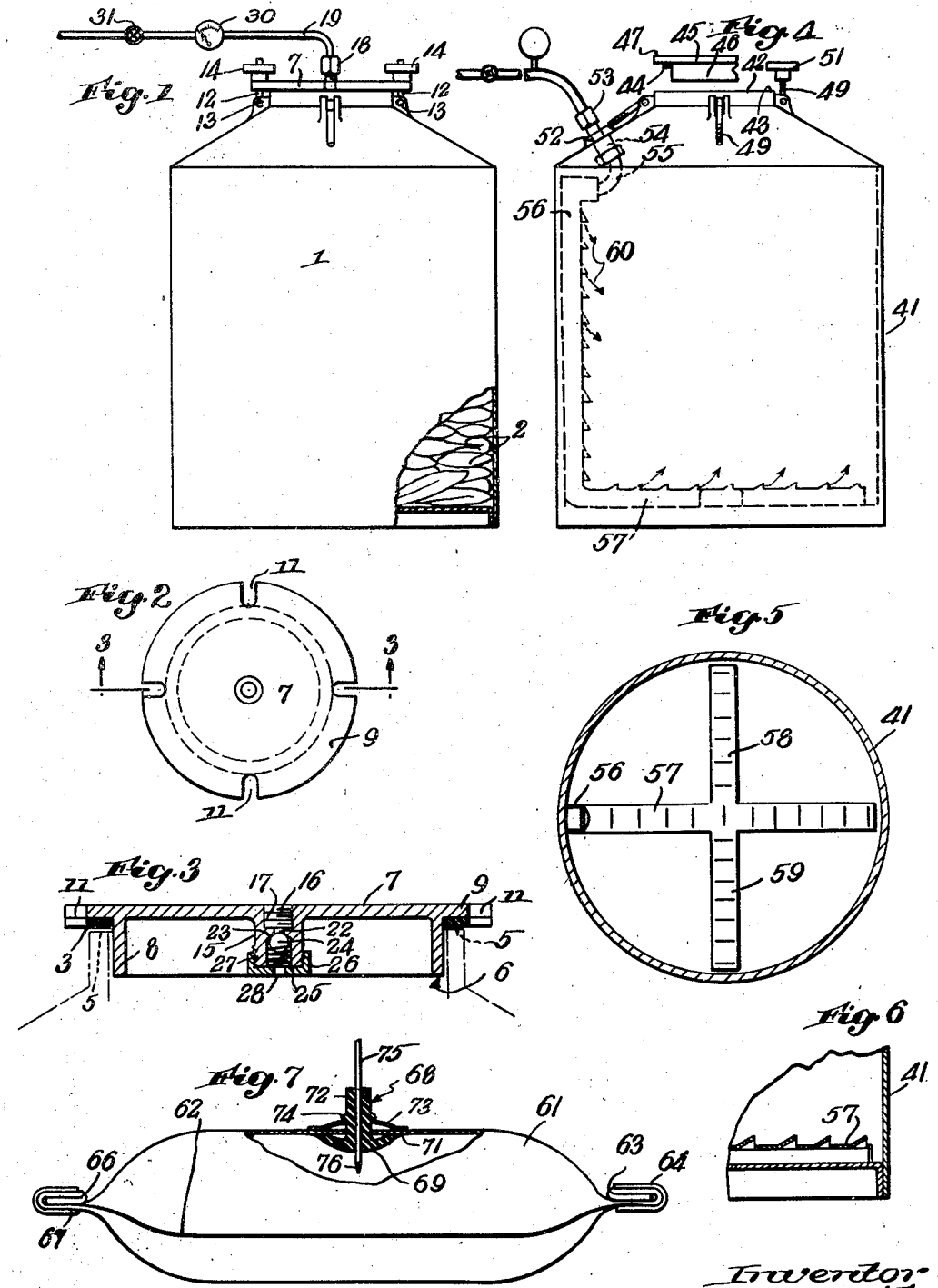
Inventor
Joseph R. Macdonald,
By Roberts, Cushman & Woodberry
his Attys.

UNITED STATES PATENT OFFICE 2,402,199

METHOD OF KEEPING FISH IN FRESH CONDITION

Joseph R. Macdonald, Winchester, Mass.

Application November 1, 1939, Serial No. 302,288

7 Claims. (Cl. 99—188)

This invention relates to a method of and means for keeping fish in fresh condition.

In the usual commercial practices of catching fish, it is customary to bring them on board the vessel in nets or on trawls, in relatively large quantities at a time. In any given haul the fish sometimes will be all of one kind. But more often they will contain at least a few of various other kinds. Those which are not commercially useful will be thrown overboard, while those which are kept are sorted out and cleaned. They are then iced down in the hold of the vessel in order to keep them until the vessel returns to port or transfers them to another boat, as the case may be.

The cleaning operation consists in slitting the fish beneath the gills and then lengthwise of the body and removing the entrails. The head, tail and fins are left intact with the body, which is thrown into the hold (which may be divided into bins or various compartments) along with an approximately equal amount of crushed ice. As thus brought to port and unloaded, some of the fish are marketed as fresh fish, while the rest may be processed in various ways—as by salting, smoking, canning, quick freezing, and the like.

It will be apparent that in handling fish in this way, the exposed surfaces are subject to contamination in various ways—as from the air, from the handling, from the ice, from the bins or other containers in the hold, and from bacteria which may already be contained in the fish itself. That such infection occurs may be shown by the progressive increase in bacteria count in fish which have been so kept and also by disintegration of the tissues, especially on and in the surfaces and inner portions of the body cavity which have been exposed by the cleaning operation.

One typical indication of such disintegration is manifested by the disruption of the main artery which in many fish is found to run longitudinally of and on the inner side of the back bone. In a few days, in fish as ordinarily kept by icing, this artery spontaneously softens, disintegrates, and gives way, releasing the arterial blood contained in it, which thereafter renders the adjacent areas especially subject to accelerated growth of bacteria and more rapid and extensive disintegration.

Similar continued deterioration of fish continues during storage, transportation and marketing, and also in the hands of ultimate consumers.

It is accordingly an object of this invention to provide an improved method for the handling and preservation of fish, which may be applied at any stage or stages from that of catching the fish to that of its ultimate use or consumption as food, or which may advantageously be applied and maintained continuously throughout this period. It is also an object to provide for promptly protecting the fish from further contamination and to overcome such contamination as it may unavoidably acquire or which it may already have contained before being caught. Other objects will appear from the following disclosure.

In conjunction with the present invention, it is found that both the outside skin of the fish and the lining of the body cavity of the fish after it has been cleaned is more effectively preserved if it is not washed nor wet with water, as occurs in the usual process of icing them down, as above described. It may well be that this is because such surfaces are more free from contamination than the water or ice which is used. But it is also believed that such surfaces are naturally associated with a slime or mucous coating which is both sterile and resistant to contamination or disintegration if left in situ on the corresponding surfaces of the fish.

Nevertheless, if desirable for any reason, the fish may be cleaned and washed, on both the inside and outside surfaces, as is sometimes done to facilitate or complete the cleaning operation, and then treated by the present process. It may be said that the present process is more necessary for the preservation of the fish in such cases, and that it is consequently somewhat more active under such circumstances.

Moreover, the process is also applicable for keeping fish which have been not only cleaned but further processed as by cutting into fillets, steaks, flakes, cubes, or the like, or dried, or even fish which have been smoked, to advantage. It may also be applied to certain types of shell fish, such as lobster and crab meat, after their shells have been removed, and whether cooked or uncooked.

By the present invention it is found that such materials which are in general intended for use as human food, may be both kept in their fresh condition for a considerable period of time and also actually improved in quality by displacing air therefrom and intimately contacting and surrounding their surfaces with a high concentration of oxygen or with pure oxygen (i. e., as commercially available in cylinders) at a pressure equal to or greater than atmospheric pressure and hermetically sealing the treated material in closed containers, to prevent the intrusion of air, etc., for shipment, storage, and the like.

Of course in some instances it may be that an oxidizing condition would be ineffective or undesirable, as when the bacteria present would thrive upon it or when the product is susceptible to oxidation and tends to form undesirable conditions or by-products. It is believed that, while such conditions are rare, they may be encountered, as for example, aerobic bacteria and strong acid forming substances. In such cases, the process would obviously not be employed, or would require supplementary consideration and conditions. Accordingly, a criterion of its suitability for direct application in any given case may be established by determining whether the exposed surfaces of the material in question are likely to contain bacteria or other forms of germ life, including molds, etc., which produce or thrive under reducing conditions and which are accordingly exterminated (and such reducing conditions offset or overcome) by oxidation. A similar criterion may exist in terms of chemical components which, with or without reference to the presence of any form of life or life processes, may cause or undergo chemical reactions, resulting in deleterious conditions and which are prevented from forming or are overcome by oxidation. To materials in which either or both of these conditions obtain, therefore, the present process may be advantageously applied.

While, therefore, as above indicated, the material to be treated (such as fish) may be prepared in various ways and subjected to the present process at substantially any stage of its course between its point of origin and its final consumption, as food, the earlier in such course the process is applied the better.

For example, fish, preferably immediately upon being cleaned, are ready for direct treatment by the process. They may and usually will be sorted into their several species, although this is not necessary. They are then charged into suitable containers, which are preferably movable and capable of being thoroughly washed and sterilized inside and out, such as metal drums, and which have been thus thoroughly cleaned, as by washing with cleaning agents, water and live steam.

When sufficiently full, the container is closed and pure oxygen gas is introduced under pressure into the containers in sufficient amount at least to equal one-fourth the volume of air which may be already contained therein, in the interstices between the fish. The container is then more completely closed, if necessary, and hermetically sealed, and the high concentration of oxygen surrounding them (which will be greater than 35%) will preserve the fish for many days. The container may be chilled on the outside, to advantage, but this is not necessary in many cases.

If the loaded containers, charged with oxygen, are to be kept for a considerable time or shipped for long distances, there may be some question whether the cover has remained gas-tight or has lost some of its oxygen. This may be tested for by releasing the valve, or the like, and observing whether the contents are still under pressure, and will be effective so long as the atmosphere of oxygen is maintained. But any possibility of the entrance of air into the container, with consequent reduction in concentration of the oxygen and opportunity for contamination would be dangerous. Such occurrence is not likely to happen, but to guard against its effects in case of accident the container may be given supplementary additions of oxygen, under pressure, to maintain a positive pressure of oxygen in the contents. This may be effected from an oxygen tank of known or regulated pressure, as will be hereinafter described.

In a modification of the invention, to provide against the possibility of the fish packing together so as to enclose air or to prevent the subsequent penetration of oxygen between them, even when the oxygen is introduced into the container under pressure, the oxygen may be introduced into the container before or during the operation of charging it with fish, or both. In this way, as each fish enters the container, it is completely surrounded by substantially pure oxygen and the air within the cavity of the fish's body as well as the air which might otherwise be entrapped between the fish as they pile up in the container, is displaced therefrom and expelled from the container. In this method of procedure the motion of the fish entering the container will tend to carry air in with it, to drive oxygen out of the container, and to mix the gases at the opening. But the preliminary and continued introduction of pure oxygen into the container, and preferably into the bottom of the container, will cause it to rise upwardly and expel the air and also progressively offset this influence and assure an atmosphere in contact with, within and between the fish of high oxygen concentration or substantially of pure oxygen, depending upon the amount and rate of oxygen supplied. If it is liberally supplied before and throughout the charging of the container with the fish, and continued after the container is filled so as to flush out admixtures of air at the opening, the tank will have a gaseous atmosphere of substantially pure oxygen. After closing the cover and sealing it, additional oxygen may be introduced, under pressure, to assure its continuance throughout storage and transit.

A typical and representative example of the practical application of the invention will be described with reference to the accompanying drawing, in which:

Fig. 1 is a side elevation of a tank, with a portion broken away to show that it is charged with fish, and suitably attached to a source of oxygen for introducing oxygen under pressure;

Fig. 2 is an enlarged plan view of the cover of the tank in Fig. 1;

Fig. 3 is an enlarged diametrical cross-section of the cover and top of the tank shown in Fig. 1;

Fig. 4 is a side elevation of another form of tank showing in dotted lines means by which the oxygen is introduced through the side wall;

Fig. 5 is a plan view of the oxygen inlet pipes in the bottom of the tank shown in Fig. 4;

Fig. 6 is an enlarged section of a portion of the oxygen inlet pipes in the bottom of said tank; and Fig. 7 is a side elevation, with parts broken away to show the valve mechanism, of a small, transparent container adapted for a few fish only.

In carrying out the process on board ship, the fish are cleaned in the usual way and each one as it is cleaned is thrown directly into a tank or similar suitable container, provided with the supplementary devices required in accordance with the invention. Such tanks might be built into the hold of the vessel, in some of the larger boats used for fishing, but in many respects portable tanks will be preferred, as they may be used as containers for direct re-shipment or storage.

When using portable tanks, one or more of these (after thorough cleaning and sterilization)

will be positioned on the lower deck, beneath an open hatchway, with its cover off, and a chute from the cleaning bench directed into it (not shown). As each fish is cleaned on the cleaning bench, it is thrown into the chute and thence slides into the tank. When the tank 1 is filled, or substantially so, as indicated by the portion broken away in Fig. 1, with the cleaned fish 2, a flat ring gasket 3 is placed upon the peripheral flange 9 of the cover 7, which is then placed upon the flat margin or bearing surface 5 around the opening 6, and positioned thereon by the depending circular flange 8 which fits down into the opening 6. The peripheral flange 9 and gasket 3 rest upon the flat bearing surface 5. Notches 11 in the outer portion of the peripheral flange 9 are adapted to receive the bolts 12 (Fig. 1), pivotally mounted in studs 13, fastened to or integral with the body of the tank adjacent to the opening 6. By then turning down the nuts 14 on the free ends of the bolts 12, the cover will be evenly closed and hermetically sealed.

In the center of the cover 7 is provided an interiorly positioned boss 15 having a central opening 16 passing therethrough which is threaded interiorly near its outer end at 17 to receive a coupling 18 on the hose 19, leading from a pressure cylinder of oxygen (not shown) through valve 31 and pressure gauge 30. In the middle portion of the opening or passageway 16 is provided a narrower valve portion 22 leading into an expanded portion of the passageway having a hemispherical valve seat 23, adapted to receive a spherical valve 24 held in position on the seat 23 to close the narrower portion 22 of the opening by a compressed spring 25. The latter is held in position and against the valve 24, and also regulated by adjustment of a cylindrical cap 26 screw-threaded at 27 to fit over the outer end of the boss 15 and engage threads thereon, and having an opening 28 at the center of the end and preferably in alignment with the opening 16, including the valve portion 22.

With the one-way valve thus provided and connected to the compressed oxygen supply, by the coupling 18, and hose 19 as above described, the valve 31 on the oxygen tank may be opened, whereupon pure oxygen under any given pressure as determined by the reducing valve 30, is forced past the spring-pressed, one-way valve 24, into the top of the tank 1 and mingles with the air already contained in the tank. It permeates throughout the open spaces of the charge and thus immerses all of the surfaces of the fish in an atmosphere rich in oxygen. The pressure thus developed will be at least 4 pounds per square inch, to provide a sufficient concentration of oxygen in the tank, but higher pressures may be applied, for purposes of more active sterilization and to provide for longer storage or more severe conditions of shipping.

When one tank is thus filled with fish, the chute from the cleaner's table will be directed to another open empty tank, while the filled tank is being closed, sealed, and charged with oxygen, as just described.

Upon disconnecting the tube from the oxygen tank by unscrewing the coupling 18 from the cover of the tank, the one-way valve 24 seats under the action of spring 25 and automatically closes and seals the tank gas tight. The filled tank is then stored in the hold until the ship docks. It may be kept chilled by packing ice outside or by mechanical refrigeration. But this is not essential to successful and satisfactory preservation of the fish. The tanks may be removed from the hold and transferred for re-shipment or storage, or may be opened directly and the fish distributed for sale in their fresh and improved condition or canned in various forms.

If it is thought that, due to fast charging of the fish into the tank or to the shape of the fish, etc., air may be pocketed by a mass of the fish so as to prevent the subsequent penetration of oxygen between them, even under pressure, the oxygen may be introduced before and/or during the charging of the fish. For this purpose, the tank may be constructed as shown in Fig. 4. In this form, the tank 41 has an opening 42 with a flat bearing surface 43 for a margin to receive a gasket 44, carried on the periphery of a plain flat cover 45, the latter similar to the cover 7, but having only a depending flange 46 and peripheral flange 47 to carry and bear upon the gasket 44 and hold it firmly upon the bearing surface 43, when closed, and notches to receive pivoted bolts 49, with nuts 51 thereon, for tightening the cover down.

But in addition to these provisions, an opening 52 is provided in the top portion of the tank, to which suitable connection may be made to the oxygen supply as by the coupling 53. A one-way valve 54 is also provided on the inside of the opening 52, which is not shown in detail but which may be similar to the one-way valve above described. The oxygen supply, coming through the valve 54, passes thence to a pipe 55 leading into a duct 56, which may be formed on three sides of channel shaped sheet metal and on the fourth side by the inner side of the wall of the tank 41 to which it is welded. This duct leads down the side and across the bottom as at 57, where it may branch in the center into cross ducts 58, 59.

The middle or inner wall of the duct 56 is provided with a series of downwardly directed openings 60 which are overlapped so as to prevent clogging and yet to supply oxygen effectively to all parts of the tank.

In this form the pure oxygen supply will be introduced into the tank 41 as soon as they begin to charge the fish into it or even somewhat previous to the directing of the chute into its top opening. In this way the tank may be full of oxygen, which is slightly heavier than air, when the first fish enters. Consequently, as the fish slide into the tank each one has air displaced from its entire surface, both inside and outside, and then is completely surrounded by oxygen before the next one falls upon it. In this way, no pocketing of air, so as to prevent complete surrounding and penetration of the oxygen, can occur. The supply of oxygen is also desirably continued throughout the charging operation and until the tank is closed.

When the tank is filled, the cover is put in place and closed and sealed by turning down the nuts 51. The stream of oxygen may be continued, however, so as to dispel admixture of air near the opening. And the oxygen may also be continued after the tank is closed and sealed so as to afford an additional supply, build up a positive pressure, and aid in penetrating and preserving the fish. Upon disconnecting the oxygen line, by removing the coupling 53, the one-way valve 54 seats and seals the container against loss of oxygen or entrance of air.

The fresh, cleaned fish, as thus charged into the container and surrounded by pure oxygen or a mixture of oxygen and air which is rich in its pure oxygen content, appears not only to be protected from contamination and sterilized throughout all of its exposed surfaces and cavities with respect to bacteria and the like, but also to be effectively permeated by the active gas and sterilized within the tissues and other structures of the body of the fish. The pressure of the oxygen, while not necessarily great, undoubtedly contributes to this result, and the fact that the tissues are free from additional moisture also facilitates such absorption and penetration. This maintenance of pressure upon the outside of the tissue structures of the fish is thought to simulate the pressure to which such structures were subjected in the live fish, when living at considerable depths beneath the surface of the water. But it is of course gaseous pressure in contrast to the liquid pressure of the water.

Evidence of such influences is found in the natural color of the various surfaces of the fish after being preserved in this way, the maintenance of the firm condition of the walls of the main artery mentioned above, without disruption or disintegration after many days, the general, characteristically fresh appearance of the outside of the fish, the brilliancy of the eyes, which is especially well preserved, the improved qualities of the fish as a food, and the fixation or actual reduction in bacteria count, as contrasted with the fresh fish.

While the units above described are for carrying out the process on a large or wholesale scale, it is none the less practical to adapt it for small scale or even retail application.

For example, a transparent container may be made, as from water resistant Cellophane by rolling it into a hollow cylinder 61, as shown in Fig. 7 and sealing the edges along the overlapped seam 62, rolling up one end 63 and fastening it with a clamp 64, putting in the fish, rolling up the other end 66, fastening it with a clamp 67 and then (or during the charging operation, or both) introducing oxygen through a one-way valve previously mounted in the side wall, as shown at 68. This may consist of a soft rubber mushroom head 69 with a thin soft periphery 71 which bears against the inside of the wall of the container, while the stem 72 is passed through the container and through an oppositely convex metal disc 73, and is held in this position by the shoulder 74. A hollow needle 75 is inserted through the stem and head of the valve and is connected to a source of oxygen under pressure. The gas enters the container through an opening 76 near the point of the needle until the desired amount of pressure has been supplied. The needle is then withdrawn and the soft rubber automatically closes the aperture behind it and hermetically seals the valve connection to the interior against loss of the gaseous supply thus provided.

When packaged in this way, a single fish may be treated in accordance with the invention, carried to one's destination, kept in a cool place, if not refrigerated, and satisfactorily and safely used for food many days after it would be unfit to eat if kept in the usual ways.

When oxygen is added to air already contained in the tank, which is at atmospheric pressure, it is necessary to introduce it at a sufficient pressure and in sufficient amount to develop a superatmospheric pressure of 4 pounds per square inch, as pointed out above. This pressure may be increased, however, with due consideration to the strength of the container and the depth of the natural habitat of the fish under treatment, etc. Likewise, when the air is displaced from the tank by oxygen, while a pressure of 4 pounds per square inch will not be necessary to provide the necessary concentration of oxygen, it is desirable to apply a pressure of 4 pounds or more per square inch, for the reasons already indicated.

I claim:

1. Method of keeping fish, comprising the steps of placing the same in a container, as surrounded with atmospheric air, closing the container, introducing oxygen into the container, under pressure, and hermetically sealing the same against subsequent intrusion of air.

2. Method of keeping fish, comprising the steps of placing the same in a container, displacing the air therein by oxygen, closing the container, and hermetically sealing the same against subsequent intrusion of air.

3. Method of keeping fish, comprising the steps of displacing the air from a container by oxygen, placing the fish therein, closing the container, and hermetically sealing the same against subsequent intrusion of air.

4. Method of keeping fish, comprising the steps of placing the same in a container, displacing the air therein by oxygen, closing the container, introducing additional oxygen under pressure, and hermetically sealing the same against subsequent intrusion of air.

5. Method of keeping fish, comprising the steps of placing the same in a container, displacing air from the surfaces of each fish, as it enters the container, with oxygen, closing the container, and hermetically sealing the same against subsequent intrusion of air.

6. Method of keeping fish, comprising the steps of placing the same in a container, displacing the air from the surfaces of each fish, as it enters the container, with oxygen, closing the container, effecting the introduction of more oxygen into the container, under pressure and hermetically sealing the same against subsequent intrusion of air.

7. Method of keeping fish, comprising the steps of placing the same in a container, with the naturally occurring protective film remaining on the outside surfaces and on the cleaned surfaces of the fish, closing the container, and introducing oxygen therein to constitute 35% or more of the ultimate gaseous content of the container.

JOSEPH R. MACDONALD.